(12) United States Patent
Tanaka

(10) Patent No.: US 6,219,552 B1
(45) Date of Patent: Apr. 17, 2001

(54) TRANSMISSION PATH SELECTING APPARATUS FOR MOBILE COMMUNICATIONS SYSTEMS

(75) Inventor: Koichi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/129,121

(22) Filed: Aug. 4, 1998

(30) Foreign Application Priority Data

Aug. 5, 1997 (JP) .................................................... 9-210983

(51) Int. Cl.$^7$ ...................................................... H04Q 7/20
(52) U.S. Cl. ............................................ 455/445; 455/446
(58) Field of Search ..................................... 455/446, 445, 455/436, 433, 450, 560

(56) References Cited

U.S. PATENT DOCUMENTS 4,284,848 * 8/1981 Frost .
5,619,551 * 4/1997 Yahagi .................................. 455/445
6,108,549 * 8/2000 Bonta ................................... 455/446

FOREIGN PATENT DOCUMENTS 6-224875   8/1994 (JP) .

* cited by examiner

Primary Examiner—William Cumming
(74) Attorney, Agent, or Firm—McGuireWoods LLP

(57) ABSTRACT

A transmission path selecting apparatus for mobile communication systems susceptible to no such timing trouble as data skipping even where hand-off control is performed is provided. The transmission path selecting apparatus of the base station is connected to radio base stations via wired transmission paths, and has a built-in reception buffer having reception areas provided correspondingly to the wired transmission paths and an extra area. The transmission path selecting apparatus stores data packets received via the wired transmission paths at each reception timing and, if a data packet to be received at a later reception timing than any of the reception timings has been received, stores a copy of the data packet into the extra area. At each reception timing, a data packet corresponding to the reception timing is read out of a reception area or the extra area, and is supplied to a higher-rank apparatus.

3 Claims, 4 Drawing Sheets $D_N$ : RECEIVED DATA HAVING FRAME NUMBER N
$D_{N+1}$ : RECEIVED DATA HAVING FRAME NUMBER N+1
$D_{N+2}$ : RECEIVED DATA HAVING FRAME NUMBER N+2
$D_{N+3}$ : RECEIVED DATA HAVING FRAME NUMBER N+3

TRANSMISSION PATH SELECTING APPARATUS FOR MOBILE COMMUNICATIONS SYSTEMS

BACKGROUND OF THE INVENTION

1. Field of the Invention

The present invention relates to a transmission path selecting apparatus for mobile communications systems, to perform so-called hand-off switching control for transmission paths.

2. Description of the Related Art

In mobile communications, since the communication path it uses involves wireless sections, how to overcome timing lags in the transmission and reception of signals and the deterioration of signal transmission performance poses a major challenge.

Regarding the problem of how to eliminate timing lags in transmission and reception, the Gazette of the Japanese Patent Laid-open No. Hei 6-224875, for example, discloses a circuit which is illustrated in FIG. 5. This circuit is used to reduce jitters on the receiving side which arise when, in TDMA mobile communications accomplished via a base station, the transmission/reception timing is synchronized with the timing of the other party station to burst transmission/reception or of a higher-rank network.

The circuit illustrated in FIG. 5 consists of a clock generator 101, a phase comparator 102, a temporary memory 103, a frequency division phase controller 104, a frequency divicer 105 and a transmission/reception timing generator 106. Here the clock generator 101 supplies a clock NfCLK, which is N times a processing clock matching the transmission/reception timing. The frequency division phase controller 104 supplies a frequency division phase clock φ resulting from the addition, with N as modulus, of a phase offset obtained by accumulating the reference phase, which results from the frequency division of this clock NfCLK, and the phase difference output. The transmission/reception timing generator 106 supplies a desired transmission/reception timing output T0 and a gate timing signal GT. The phase comparator 102 detects a phase difference ε between a reception frame timing FT and a frame clock FC resulting from the frequency division of the frequency division phase clock φ by the frequency divider 105, and the temporary memory 103 stores this phase difference ε. Then, in this circuit, a frequency division phase clock φ matching the phase difference ε is selected when the gate timing signal GT is on, and this operation serves to absorb jitters.

On the other hand, addressing the deterioration of signal transmission performance, the Gazette of the Japanese Patent Laid-open No. Hei 1-274524 discloses a cellular telephone system using the so-called hand-off technique. The hand-off technique in this context means a control method whereby, when the state of communications during communication by one mobile station with another party via a radio base station, is deteriorated by fading or the like, the base station switches the radio base station connected to that mobile station to another and thereby keeps the state of communications satisfactory. In the system disclosed in the above-cited gazette, a data communications call is subjected to hand-off control on the basis of the signal strength, bit error rate, packet volume of radio channel data, traffic of data packets and throughput of data packets among other factors.

Incidentally, when the aforementioned hand-off control is carried out, because a lag may arise in the timing at which data packet signals are handled at the base station responsible for the transmission and reception of signals to and from the mobile station via radio base stations, inviting skipping of some data and/or other failures. To address this problem, though it is conceivable to apply the aforementioned technique to absorb jitters on the part of the base station, the jitters will be too great to be absorbed if the hand-off control invites a long timing lag, and some data will then be skipped.

The present invention, undertaken in view of the above-described circumstances, is intended to provide a transmission path selecting apparatus for mobile communications systems free from data skipping and other kinds of timing trouble even where hand-off control is carried out.

SUMMARY OF THE INVENTION

According to the present invention, there is provided a transmission path selecting apparatus for a mobile communications system connected to a plurality of radio base stations by wired transmission paths, wherein data packets transmitted from a mobile station are received via the radio base stations and the wired transmission paths, and a set of received data coming via one of the radio base stations out of the sets of received data is selected and supplied to a higher-rank apparatus, comprising:

a reception buffer having reception areas provided correspondingly to said wired transmission paths and an extra area:

means for storing data packets successively received via the wired transmission paths at each reception timing and, at the same time, if a data packet to be received at a later reception timing than any of the reception timings has been received, storing the data packet into said extra area; and frame selecting means for reading at each reception timing a data packet corresponding to the reception timing out of a reception area or the extra area in said reception buffer, and supplying it to said higher rank apparatus.

According to the invention, there is also provided a transmission path selecting apparatus for a mobile communications system, as claimed in claim 1, wherein two of said reception areas are provided for each wired transmission path, and data packets received via the wired transmission paths are held by one or the other of the two reception areas alternately.

According to the invention there is further provided a transmission path selecting apparatus for a mobile communications system, as claimed in claim 1, wherein it is judged, according to a frame number assigned to each of said data packets, whether a given data packet is to be received at a given reception timing or to be received at a later reception timing.

DETAILED DESCRIPTION OF THE PREFERRED EMBODIMENT

A preferred embodiment of the present invention will be described in detail below with reference to the drawings.

Figure 1:
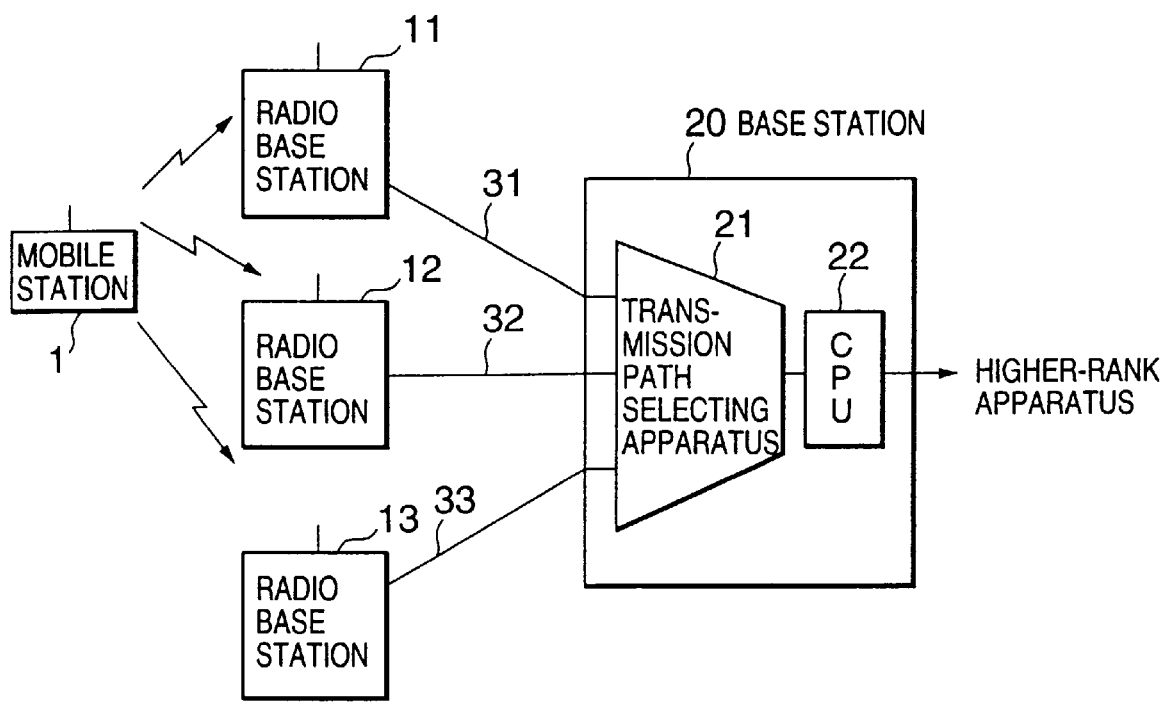
FIG. 1 is a block diagram illustrating the configuration of a mobile communications system, which is a preferred embodiment of the present invention.

FIG. 1 is a block diagram illustrating the construction of a mobile communication system, which is the preferred embodiment of the present invention. In this diagram, reference numeral 1 denotes a mobile station; 11 to 13, radio base stations; and 20, a base station. Here, the radio base stations 11 to 13 are connected to the base station 20 by wired transmission paths 31 to 33, respectively. The base station 20 has a transmission path selecting apparatus 21 and a CPU 22.

In this construction, signals transmitted from the mobile station 1 are supplied to the transmission path selecting apparatus 21 of the base station 20 via the radio base stations 11 to 13 and the respectively corresponding wired transmission paths 31 to 33. Out of these signals, one involving no transmission error is selected by the transmission path selecting apparatus 21, and sent to a higher-rank apparatus by the CPU 22.

Figure 2:
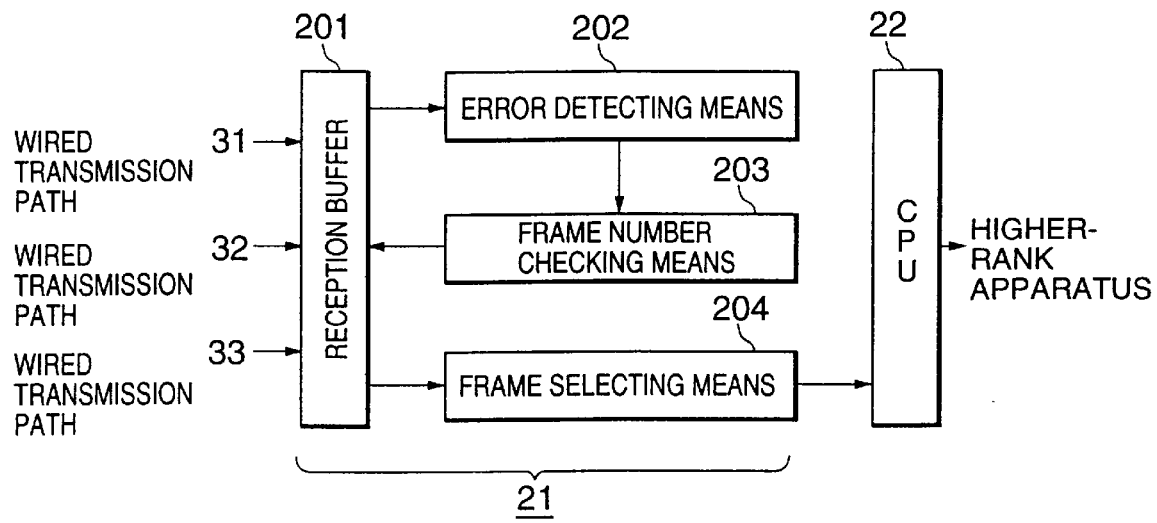
FIG. 2 is a block diagram illustrating the configuration of the transmission path selecting apparatus in this embodiment of the invention.

FIG. 2 is a block diagram illustrating the internal construction of the base station 20 in detail. As the diagram shows, the transmission path selecting apparatus 21 in the base station 20 has a reception buffer 201, error detecting means 202, frame number checking means 203, and frame selecting means 204.

Figure 3:
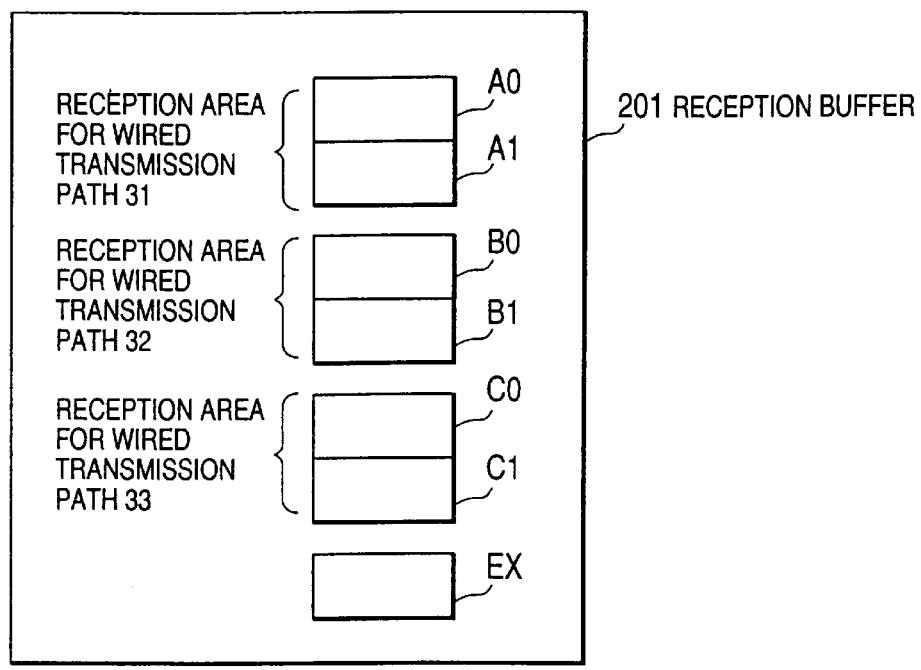
FIG. 3 is a diagram illustrating areas in the reception buffer in this embodiment.

Here, the reception buffer 201, as illustrated in FIG. 3, has reception areas A0 and A1 for holding received data from the wired transmission path 31, reception areas B0 and B1 for holding received data from the wired transmission path 32, reception areas C0 and C1 for holding received data from the wired transmission path 33, and an extra area EX. That is to say, it has two reception areas corresponding to each wired transmission path and, apart from them, one extra area.

Figure 4:
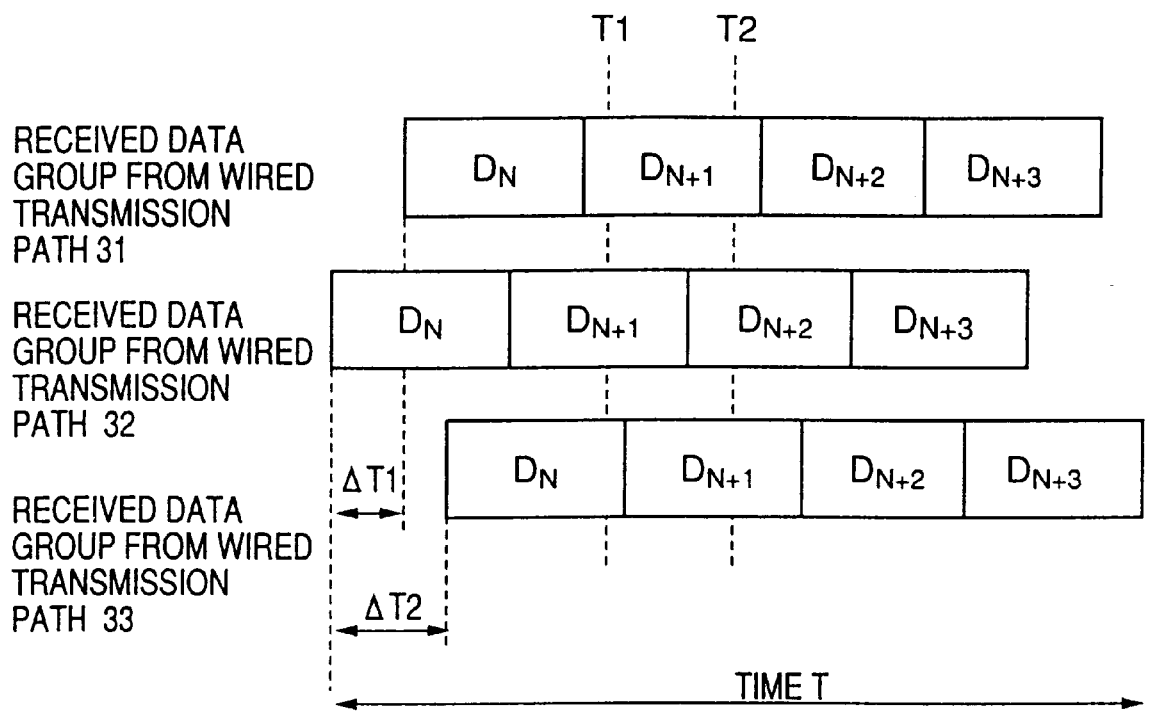
FIG. 4 is a time chart illustrating the operation of this embodiment.
Figure 5:
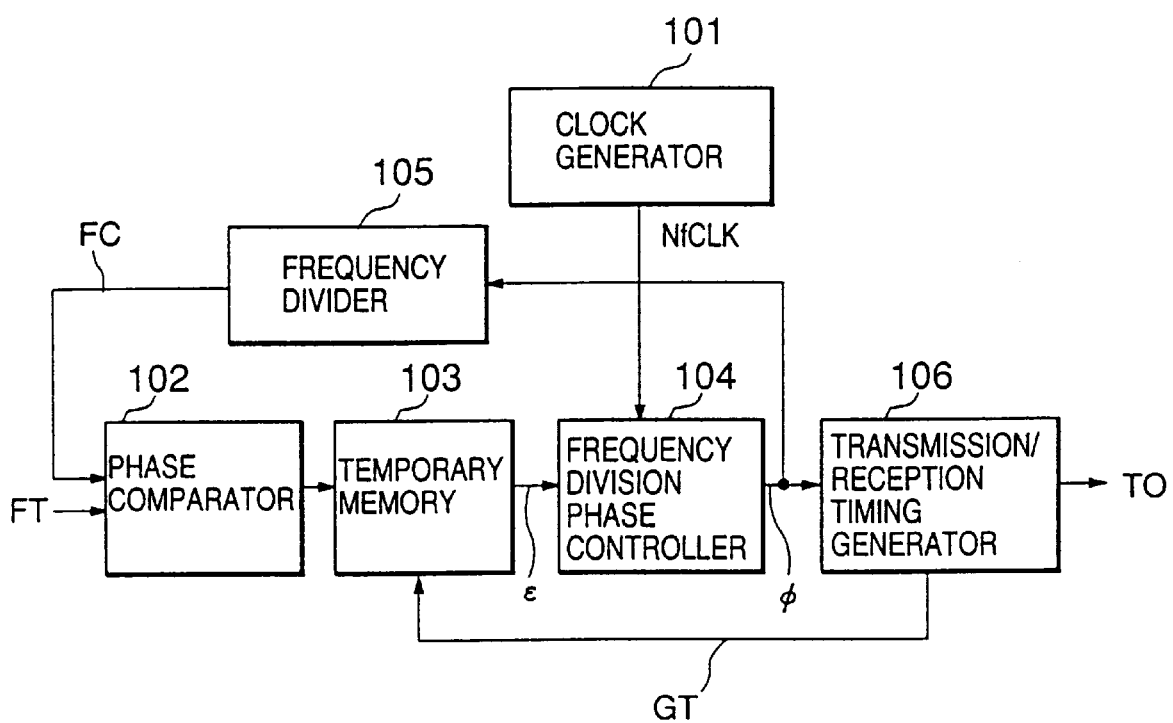
FIG. 5 is a block diagram illustrating the configuration of a synchronization circuit for absorbing jitters in TDMA mobile communications.

FIG. 4 illustrates examples of data groups arriving at the transmission path selecting apparatus 21 via the wired transmission paths 31 to 33. The operation of this preferred embodiment will be described below with reference to this diagram.

As shown in FIG. 4, the transmission path selecting apparatus 21 is supplied with a series of ATM data packets DN, DN+1, DN+2, DN+3, . . . having respective frame numbers N, N+1, N+2, N+3, . . . via the wired transmission paths 31 to 33. The ATM data packet groups having arrived via these wired transmission paths have mutual lags in reception timing because they have traveled over different wireless sections. In the illustrated examples, the data packet group arriving via the wired transmission path 32 is received earlier than that arriving via the wired transmission path 31 by a time length of ΔT1, and that arriving via the wired transmission path 33 is received later than that arriving via the wired transmission path 32 by a time length of ΔT2.

ATM data packets successively received via the wired transmission paths are supplied to the reception buffer 201, and alternately written into one or the other of the two reception areas provided for each-wired transmission path. Thus, the ATM data packets DN, DN+1, DN+2, DN+3, . . . arriving via the wired transmission path 31, for instance, are successively written into the reception areas A0 and A1 alternately, title first data packet DN into the reception area A0, the next data packet DN+1 into the reception area A1, the next data packet DN+2 into the reception area A0, the next data packet DN+3 into the reception area A1, and so forth. The same applies to the other wired transmission paths 32 and 33. The ATM data packets arriving via the wired transmission path 32 are successively written into the reception areas B0 and B1 alternately, and so are those arriving via the wired transmission path 33 into the reception areas C0 and C1.

On the other hand, the ATM data packets written into the respective reception areas for the wired transmission paths are checked by the error detecting means 202 as to the presence or absence of reception errors. Those ATM data packets in which no reception error was detected are further checked for the frame number by the frame number checking means 203. If the frame number of any ATM data packet is greater than expected (i.e. usually the number immediately following the Latest checked frame number), a copy of that ATM data packet is stored into the extra area EX. Or, if the frame number of an ATM data packet, which has been checked for errors and found to involve no error, is exactly the expected frame number, the ATM data packet is stored into the reception area for which it is destined according to the above-described sequence.

The frame selecting means 204, at each of reception timings of prescribed periodicity, selects an ATM data packet whose frame number is as expected, out of the ATM data packets stored in the different areas of the reception buffer 201, and transmits it to the CPU 22, which delivers it to the higher-rank apparatus.

In this reading of an ATM data packet in the reception buffer 201 by the frame selecting means 204, a hand-off action is performed by switching of the area from which to read but. After this hand-off action, the frame selecting means 204 reads an ATM packet data whose frame number is as expected out of the reception area corresponding to a new wired transmission path, and transmits it to the CPU 22.

As described so far, in this embodiment of the invention, ATM data packets having arrived via the wired transmission paths are stored into reception areas each matching one or another of the wired transmission paths, and those having respectively expected frame numbers are selectively read out of the reception areas. Therefore, even if the arrival timing of ATM data packets fluctuates on some wired transmission path, the ATM data packets can be received normally. In the example shown in FIG. 4, according to whether an ATM data packet has been received via the wired transmission paths at a reception timing T1 or at another reception timing T2, the received content may differ. Even in such a situation, the ATM data packet is held in a reception area for each wired transmission path, and what is ahead of its proper phase is stored in the extra area, with the result that none of the ATM data packets whose frame numbers indicate that they should be received fails to be received.

Incidentally, although the preferred embodiment was described above with reference to an instance in which there are three radio base stations, the invention is obviously applicable also to a system having N (N≧4) radio base stations. In this case, if 2N reception areas matching the radio base stations (wired transmission paths) and one extra area are provided in the reception buffer and similar control to what was described above is performed, the same effect as the foregoing embodiment can be achieved.

As hitherto described, the transmission path selecting apparatus for mobile communications systems according to the present invention provides the benefit of making possible hand-off control without inviting timing trouble such as skipping of some data.

What is claimed is:

1. A transmission path selecting apparatus for a mobile communication system connected to a plurality of radio base stations by wired transmission paths, wherein data packets transmitted from a mobile station are received via the radio base stations and the wired transmission paths, and a set of received data coming via one of the radio bases stations out of the sets of received data is selected and supplied to a higher-rank apparatus, comprising:

a reception buffer having reception areas provided correspondingly to said wired transmission paths and an extra area:

means for storing data packets successively received via the wired transmission paths at each reception timing and, at the sane time, if a data packet to be received at a later reception timing than any of the reception timings has been received, storing the data packet into said extra area; and frame selecting means for reading at each reception timing a data packet corresponding to the reception timing out of a reception area or the extra area in said reception buffer, and supplying it to said higher-rank apparatus.

2. A transmission path selecting apparatus for a mobile communication system, as claimed in claim 1, wherein two of said reception areas are provided for each wired transmission path, and data packets received via the wired transmission paths are held by one or the other of the two reception areas alternately.

3. A transmission path selecting apparatus for a mobile communication system, as claimed in claim 1, wherein it is judged, according to a frame number assigned to each of said data packets, whether a given data packet is to be received at a given reception timing or to be received at a later reception timing.

* * * * *